(12) United States Patent
Lin et al.

(10) Patent No.: US 10,704,726 B2
(45) Date of Patent: Jul. 7, 2020

(54) CURVED FLOW CHANNEL WITH BUILT-IN LATTICE STRUCTURE

(71) Applicant: National Chung-Shan Institute of Science and Technology, Taoyuan (TW)

(72) Inventors: Po-Shen Lin, Taoyuan (TW);
Chih-Peng Chen, Taoyuan (TW);
Kuo-Kuang Jen, Taoyuan (TW);
Yu-Ching Tseng, Keelung (TW)

(73) Assignee: National Chung-Shan Institute of Science and Technology, Taoyuan (TW)

( * ) Notice: Subject to any disclaimer, the term of this patent is extended or adjusted under 35 U.S.C. 154(b) by 54 days.

(21) Appl. No.: 16/169,986

(22) Filed: Oct. 24, 2018

(65) Prior Publication Data

US 2019/0186669 A1 Jun. 20, 2019

(30) Foreign Application Priority Data

Dec. 18, 2017 (TW) .............................. 106144318 A (51) Int. Cl.
| | |
|---|---|
| *F16L 43/00* | (2006.01) |
| *F16L 9/00* | (2006.01) |
| *F17D 1/20* | (2006.01) |
| *F17D 1/08* | (2006.01) |
| *F15D 1/06* | (2006.01) |
| *F15D 1/04* | (2006.01) |
| *F15D 1/00* | (2006.01) |
| *B33Y 80/00* | (2015.01) |

(52) U.S. Cl.
CPC ............ *F16L 43/00* (2013.01); *F15D 1/0085* (2013.01); *F15D 1/04* (2013.01); *F15D 1/06* (2013.01); *F16L 9/006* (2013.01); *F17D 1/08* (2013.01); *F17D 1/20* (2013.01); *B33Y 80/00* (2014.12)

(58) Field of Classification Search
CPC .... F16L 43/00; F15D 1/04; F15D 1/06; E04F 17/04; F24F 13/0263; F24F 13/24
USPC ................. 138/110, 177, 178; 181/224, 268; 454/346, 906
See application file for complete search history.

(56) References Cited

U.S. PATENT DOCUMENTS

| | | | | |
|---|---|---|---|---|
| 4,280,360 A | | 7/1981 | Kobayashi | |
| 4,362,223 A | * | 12/1982 | Meier | ............... F16L 55/02763 181/206 |
| 5,449,499 A | * | 9/1995 | Bauer | ................ B01D 53/8631 422/176 |

(Continued)

FOREIGN PATENT DOCUMENTS

| | | |
|---|---|---|
| CN | 201318526 Y | 9/2009 |
| CN | 204729825 U | 10/2015 |

(Continued)

*Primary Examiner* — Patrick F Brinson
(74) *Attorney, Agent, or Firm* — Winston Hsu (57) ABSTRACT

The curved flow channel with built-in lattice structure provided by the present application is configured with the lattice structure disposed at the outer inside wall of the curved section away from a center of curvature of the curved section. Through geometry and distribution design of the lattice structure, flow rate and flow direction of fluid impacting the lattice structure can be altered, which achieves the purpose of flow rate redistribution in the curved flow channel and produces a downstream flow field with uniform distribution.

18 Claims, 6 Drawing Sheets

(56) References Cited

U.S. PATENT DOCUMENTS

| | | | | |
|---|---|---|---|---|
| 6,533,657 | B2* | 3/2003 | Monson | F24F 13/0263 |
| | | | | 454/346 |
| 6,640,926 | B2* | 11/2003 | Weinstein | E04F 17/04 |
| | | | | 181/224 |
| 8,087,491 | B2* | 1/2012 | Merchant | F01D 25/30 |
| | | | | 181/224 |
| 8,141,588 | B2* | 3/2012 | Tan | F15D 1/04 |
| | | | | 138/37 |
| 2002/0168933 | A1 | 11/2002 | Monson | |
| 2002/0179166 | A1 | 12/2002 | Houston | |
| 2013/0213733 | A1* | 8/2013 | Katou | F02C 7/24 |
| | | | | 181/224 |
| 2014/0020783 | A1 | 1/2014 | Zazovsky | |
| 2017/0198988 | A1* | 7/2017 | Herring | F28F 9/0268 |

FOREIGN PATENT DOCUMENTS

| | | |
|---|---|---|
| JP | S56-85789 U | 7/1981 |
| WO | 2016/027438 A1 | 2/2016 |

\* cited by examiner

CURVED FLOW CHANNEL WITH BUILT-IN LATTICE STRUCTURE

BACKGROUND OF THE INVENTION

1. Field of the Invention

The invention relates to a flow channel application, and more particularly, to a curved flow channel with a built-in lattice structure made by additive manufacturing.

2. Description of the Prior Art

When fluid such as liquid, gas, or a liquid-gas mixture flows through a pipe, the fluid flows faster along an outer course at a turning corner of the pipe due to inertia and forms a recirculation zone along an inner course at the turning corner, which produces a downstream flow field with non-uniform distribution. For high precision processes such as inert gas injection and ingredient liquid injection, an injected flow field with uniform distribution is required, which requires proper design of the flow channel in the pipe. To achieve the aforementioned objectives, conventional applications often adjust configuration at the turning corner of the pipe or add a baffle or other flow guiding structures into the pipe. However, design and installation of the additional baffle or the flow guiding structures into the complex flow channel conventionally requires the pipe to be disassembled and assembled as a group of components, which increases manufacturing cost and is time-consuming.

The China patent CN201318526Y discloses a wear-resistant structure disposed to a gas duct used in an industrial kiln furnace with high working temperature. The wear-resistant structure disposed at the turning corner of the gas duct is a regular array of protrusions. However, the wear-resistant structure is only for preventing an inner wall of the gas duct from wearing but not for achieving a discharging flow field with uniform distribution required in additive manufacturing. Besides, the US patent US20140020783 adds a heterogeneous regular structure to an inner surface of a flow channel so that friction between the flow channel and a fluid flowing therethrough is reduced. However, the design of the heterogeneous regular structure cannot solve the problem of flow rate difference between the outer course and the inner course at the turning corner due to inertia, which leads to a downstream flow field with non-uniform distribution. In addition, the China patent CN103498988A discloses bionic ribs disposed to the turning corner of a bionic wear-resistant duct. However, the design of the bionic ribs are only for preventing the turning corner from rupture and leakage due to fluid-washout wearing but not for achieving a discharging flow field with uniform distribution required in additive manufacturing.

SUMMARY OF THE INVENTION

It is an objective of the present application to provide a curved flow channel with a built-in lattice structure disposed at the inside wall of the curved section away from a center of curvature of the curved section. Through geometry and distribution design of the lattice structure, flow rate and flow direction of a fluid impacting the lattice structure can be altered, which achieves the purpose of flow rate redistribution in the curved flow channel and produces a downstream flow field with uniform distribution.

To achieve the abovementioned objective, the present application discloses a curved flow channel with a built-in lattice structure which includes a curved section and a lattice structure disposed inside the curved section. The lattice structure is disposed at an outer inside wall of the curved section away from a center of curvature of the curved section. A cross-sectional area of the lattice structure is equal to or less than a half of a cross-sectional area of the curved section of the curved flow channel.

According to an embodiment of the present application, the lattice structure is integrated with the curved flow channel via additive manufacturing.

According to an embodiment of the present application, the lattice structure comprises a plurality of unit lattices.

According to an embodiment of the present application, each of the plurality of unit lattices is shaped as a cubic lattice.

According to an embodiment of the present application, each of the plurality of unit lattices is shaped as a face-centered cubic lattice.

According to an embodiment of the present application, each of the plurality of unit lattices is shaped as a body-centered cubic lattice.

According to an embodiment of the present application, each of the plurality of unit lattices is shaped as a cross-shaped lattice.

According to an embodiment of the present application, the plurality of unit lattices are arranged in a uniform distribution.

According to an embodiment of the present application, the plurality of unit lattices are arranged in a non-uniform distribution.

The curved flow channel with built-in lattice structure provided by the present application is configured with the lattice structure disposed at the outer inside wall of the curved section away from a center of curvature of the curved section. When the fluid in the curved flow channel flows through the lattice structure, the friction between the lattice structure and the fluid slows and directs the fluid to loosely structured or void locations of the lattice structure so that the flow rate and the flow direction of the fluid is altered, which produces a downstream flow field with the uniform distribution via flow rate redistribution in the flow channel. The lattice structure of the present application can be integrated with the curved flow channel via additive manufacturing. In addition, the distribution of the corner points of the unit lattices of the lattice structure can be adjusted via additive manufacturing according to actual demands so as to modulate the flow rate and the flow field at the curved section of the curved flow channel. The present application can be utilized in fluid transportation fields, such as oil pipes, water tubes, ingredient liquid piping, air pipes and liquid-gas piping, and therefore has versatile applications.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure (s) being described. The components of the present invention can be positioned in a number of different orientations. As such, the directional terminology is used for purposes of illustration and is in no way limiting. Accordingly, the drawings and descriptions will be regarded as illustrative in nature and not as restrictive.

Figure 1:
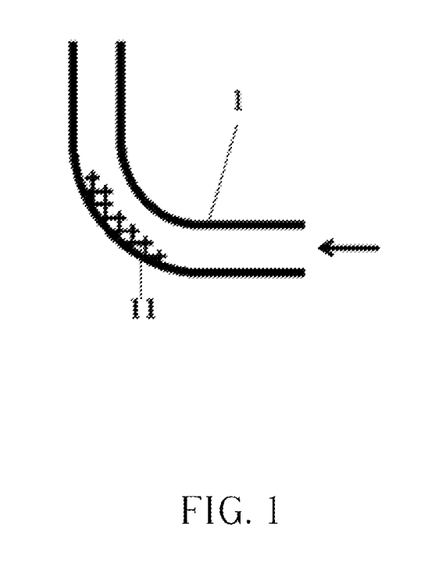
FIG. 1 is a diagram of a curved flow channel with built-in lattice structure according to an embodiment of the present application.

Please refer to FIG. 1. FIG. 1 is a diagram of a curved flow channel with built-in lattice structure 11 according to an embodiment of the present application. As shown in FIG. 1, the curved flow channel 1 includes a curved section and the lattice structure 11 disposed inside the curved section and at an outer inside wall of the curved section away from a center of curvature of the curved section. When fluid (with a flow direction indicated by the arrowhead shown in FIG. 1) flows through the curved flow channel 1, the fluid can be slowed by friction between the fluid and the lattice structure 11 and directed to loosely structured or void locations of the lattice structure 11 so that a flow rate and the flow direction of the fluid is altered, which produces a downstream flow field with uniform distribution (at a place close to a discharging opening of the curved flow channel 1). In addition, frictional heat generated at the inside wall of the curved flow channel 1 can be conducted via solid contact to the lattice structure 11, which increases area of heat exchange between the fluid and the curved flow channel 1, and a turbulence generated when the fluid flows through the lattice structure 11 also enhances heat exchange efficiency between the fluid and the curved flow channel 1. According to a preferred embodiment, a cross-sectional area of the lattice structure 11 can be equal to or less than a half of a cross-sectional area of the curved section of the curved flow channel 1, which prevents the fluid from being excessively slowed or retarded by excessive friction.

Figure 2:
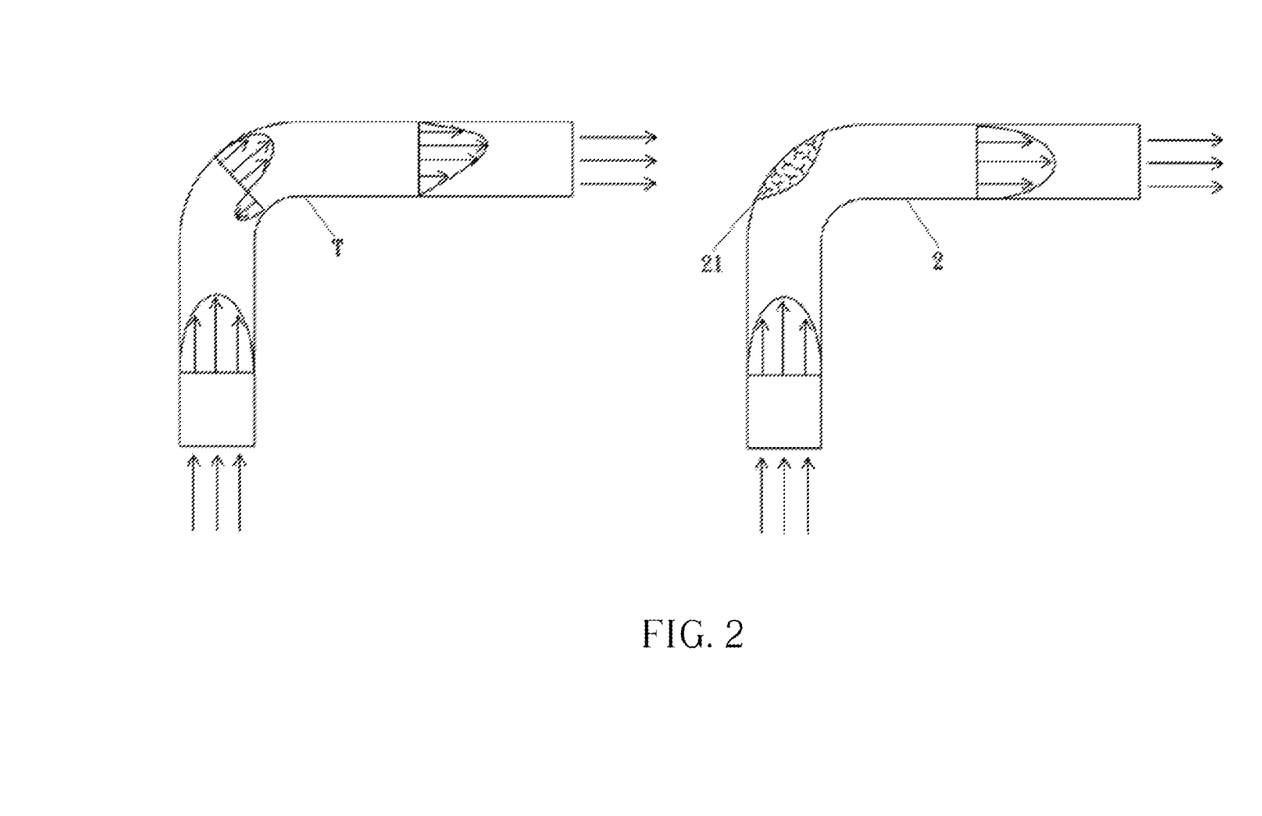
FIG. 2 is a diagram illustrating a comparison between a flow field in a conventional curved flow channel and a flow field in a curved flow channel of the present invention according to an embodiment of the present application.

Please refer to FIG. 2. FIG. 2 is a diagram illustrating a comparison between a flow field in a conventional curved flow channel T and a flow field in a curved flow channel 2 of the present invention according to an embodiment of the present application. As for the conventional flow channel T shown on the left side of FIG. 2, the flow field tends to have non-uniform distribution downstream since a flow flows faster along an outer course of a curved section due to inertia and forms a recirculation zone at an inner course of the curved section of the conventional curved flow channel T. As for the curved flow channel 2 of the present application shown on the right side of FIG. 2, a lattice structure 21 is disposed at a curved section of the curved flow channel 2, which can result in the flow field with the uniform distribution downstream that meets a process requirement of high discharge uniformity.

The built-in lattice structure can be designed and manufactured via present additive manufacturing applications. That is, a work-piece that was designed to be solid can be shaped as a shell structure via the additive manufacturing, and the void space inside the shell structure can be configured with the lattice structure also via the additive manufacturing. Therefore, weight reduction with high structural strength can be achieved via the aforementioned additive manufacturing applications. The present application adopts the lattice structure in the curved flow channel, and the lattice structure is integrated with the curved section of the flow channel via additive manufacturing. When the flow impacts the lattice structure with tailored structural geometry and distribution, the flow rate and the flow direction of the flow can be altered, which achieves the purpose of flow rate redistribution in the flow channel.

Figure 3:
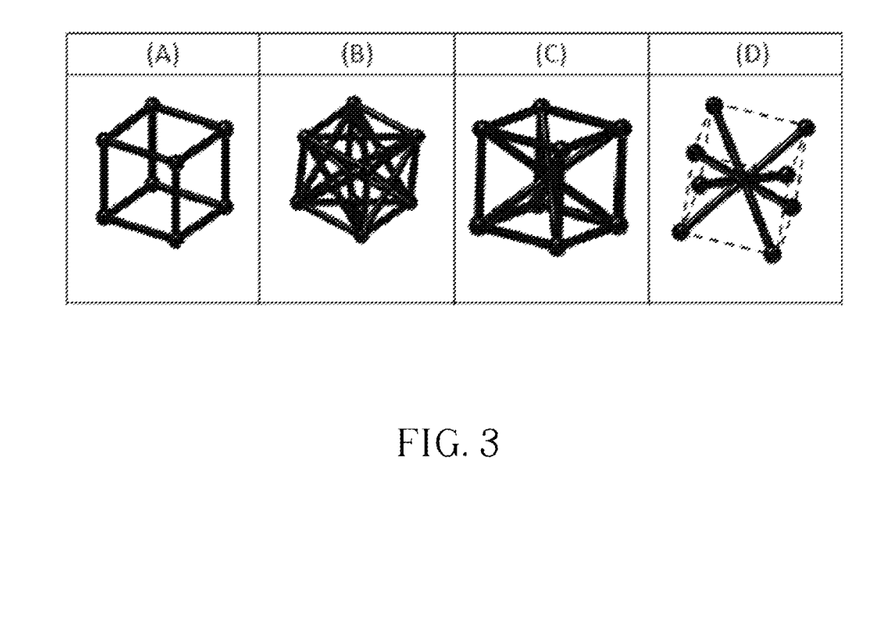
FIG. 3 is a diagram of structural geometry of unit lattices at different types according to embodiments of the present application.

Please refer to FIG. 3. FIG. 3 is a diagram of structural geometry of unit lattices at different types according to embodiments of the present application. The lattice structure of the present application includes a plurality of unit lattices in distribution. The unit lattice can be a cubic lattice A, a face-centered lattice B, a body-centered lattice C, or a cross-shaped lattice D, and the lattice structure can consist of unit lattices with at least one of the aforementioned types of structural geometry, according to demands.

Figure 4:
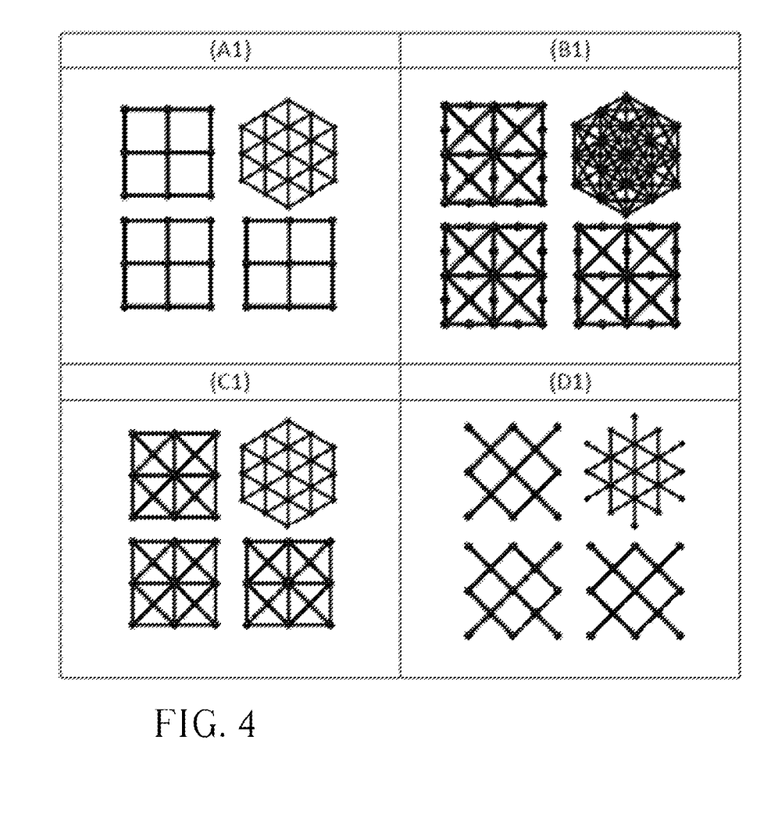
FIG. 4 to FIG. 6 illustrate different lattice structures with different structural geometry of the unit lattices according to embodiments of the present application.
Figure 5:
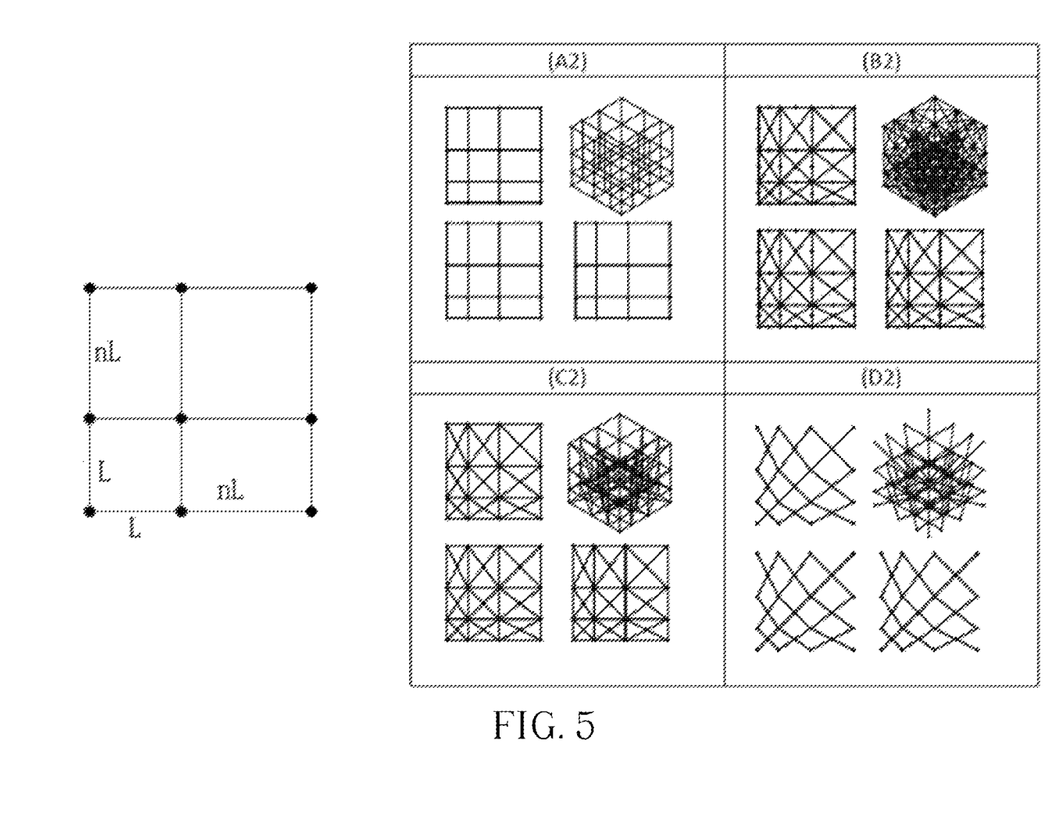
Figure 6:
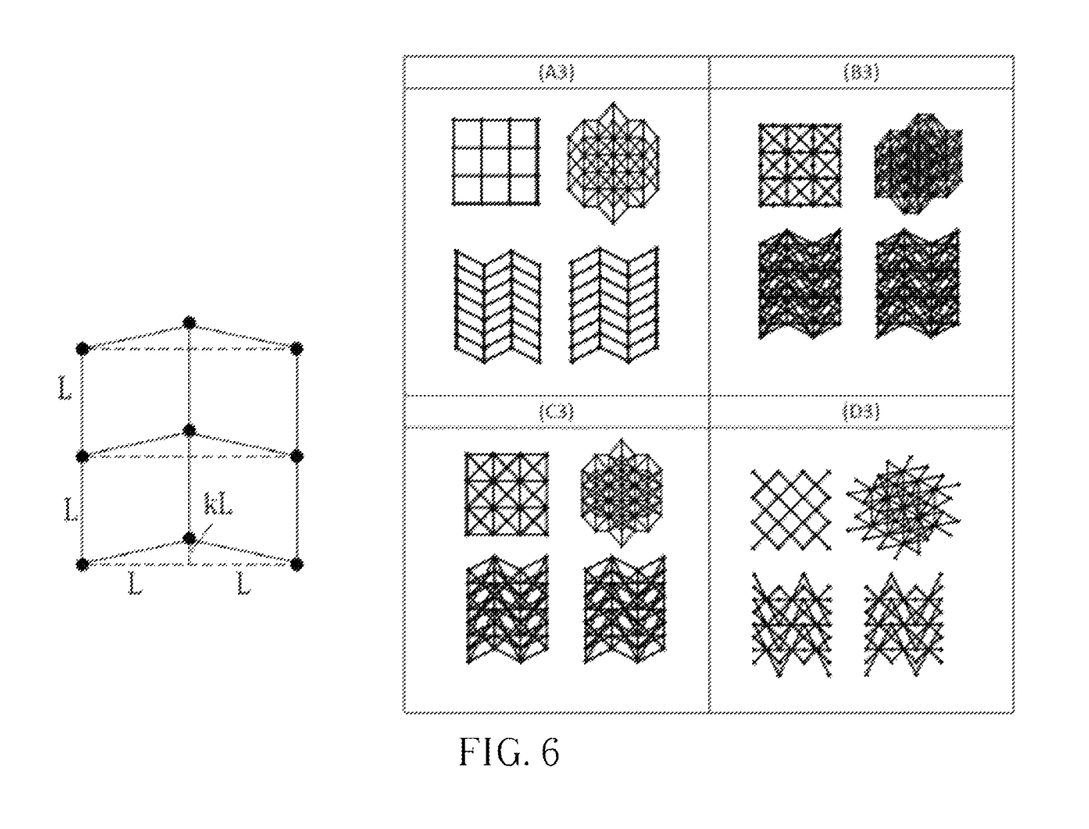

Please refer to FIG. 4 to FIG. 6. FIG. 4 to FIG. 6 illustrate different lattice structures with different structural geometry of the unit lattices according to embodiments of the present application. The distribution of the plurality of unit lattices can be uniform or non-uniform. As shown in FIG. 4, corner points of the plurality of unit lattices are equally spaced with a distance L in the uniform distribution. The lattice structures with the uniform distribution, such as the cubic lattice structure A1, the face-centered cubic lattice structure B1, the body-centered cubic lattice structure C1 or the cross-shaped lattice D1 structure in distribution with equally spaced corner points, has an advantage of easy design.

As shown in FIG. 5, corner points of the plurality of unit lattices are unequally spaced with a distance L followed by a distance nL, that is, n times the distance L, where n can be between 1 and 5, in the non-uniform distribution. The lattice structures with the non-uniform distribution, such as the cubic lattice structure A2, the face-centered cubic lattice structure B2, the body-centered cubic lattice structure C2 or the cross-shaped lattice structure D2, can more efficiently balance differences in the flow rates and distributions of the flow fields between the outer course and the inner course at the curved section.

As shown in FIG. 6, the adjacent corner points of the plurality of unit lattices are shifted vertically with respect to each other with a distance kL, that is k times the distance L, where k can be between 0 and 0.5, in a perturbed non-uniform distribution. The lattice structures with the perturbed non-uniform distribution, such as the cubic lattice structure A3, the face-centered cubic lattice structure B3, the body-centered cubic lattice structure C3 or the cross-shaped lattice structure D3, can more precisely modulate differences in the flow rates and distributions of the flow fields between the outer course and the inner course at the curved section.

The curved flow channel with built-in lattice structure provided by the present application is configured with the lattice structure disposed at the outer inside wall of the curved section away from a center of curvature of the curved section. When the fluid in the curved flow channel flows through the lattice structure, the friction between the lattice structure and the fluid slows and directs the fluid to loosely structured or void locations of the lattice structure so that the flow rate and the flow direction of the fluid is altered, which produces a downstream flow field with the uniform distribution via flow rate redistribution in the flow channel. The lattice structure of the present application can be integrated with the curved flow channel via additive manufacturing. In addition, the distribution of the corner points of the unit lattices of the lattice structure can be adjusted via additive manufacturing according to actual demands so as to modulate the flow rate and the flow field at the curved section of the curved flow channel. The present application can be utilized in fluid transportation fields, such as oil pipes, water tubes, ingredient liquid piping, air pipes and liquid-gas piping, and therefore has versatile applications.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A curved flow channel with built-in lattice structure, the curved flow channel comprising:
    a curved section;
    a lattice structure disposed inside the curved section and at an outer inside wall of the curved section away from a center of curvature of the curved section, a cross-sectional area of the lattice structure being equal to or less than a half of a cross-sectional area of the curved section of the curved flow channel, wherein the lattice structure comprises a plurality of unit lattices, and each of the plurality of unit lattices is shaped as a cubic lattice.

2. The curved flow channel of claim 1, wherein the lattice structure is integrated with the curved flow channel via additive manufacturing.

3. The curved flow channel of claim 1, wherein the plurality of unit lattices are arranged in a uniform distribution.

4. The curved flow channel of claim 1, wherein the plurality of unit lattices are arranged in a non-uniform distribution.

5. A curved flow channel with built-in lattice structure, the curved flow channel comprising:
    a curved section;
    a lattice structure disposed inside the curved section and at an outer inside wall of the curved section away from a center of curvature of the curved section, a cross-sectional area of the lattice structure being equal to or less than a half of a cross-sectional area of the curved section of the curved flow channel, wherein the lattice structure comprises a plurality of unit lattices, and each of the plurality of unit lattices is shaped as a face-centered cubic lattice.

6. The curved flow channel of claim 5, wherein the lattice structure is integrated with the curved flow channel via additive manufacturing.

7. The curved flow channel of claim 5, wherein the plurality of unit lattices are arranged in a uniform distribution.

8. The curved flow channel of claim 5, wherein the plurality of unit lattices are arranged in a non-uniform distribution.

9. A curved flow channel with built-in lattice structure, the curved flow channel comprising:
    a curved section;
    a lattice structure disposed inside the curved section and at an outer inside wall of the curved section away from a center of curvature of the curved section, a cross-sectional area of the lattice structure being equal to or less than a half of a cross-sectional area of the curved section of the curved flow channel, wherein the lattice structure comprises a plurality of unit lattices, and each of the plurality of unit lattices is shaped as a body-centered cubic lattice.

10. The curved flow channel of claim 9, wherein the lattice structure is integrated with the curved flow channel via additive manufacturing.

11. The curved flow channel of claim 9, wherein the plurality of unit lattices are arranged in a uniform distribution.

12. The curved flow channel of claim 9, wherein the plurality of unit lattices are arranged in a non-uniform distribution.

13. A curved flow channel with built-in lattice structure, the curved flow channel comprising:
    a curved section;
    a lattice structure disposed inside the curved section and at an outer inside wall of the curved section away from a center of curvature of the curved section, a cross-sectional area of the lattice structure being equal to or less than a half of a cross-sectional area of the curved section of the curved flow channel, wherein the lattice structure comprises a plurality of unit lattices, and each of the plurality of unit lattices is shaped as a cross-shaped cubic lattice.

14. The curved flow channel of claim 13, wherein the lattice structure is integrated with the curved flow channel via additive manufacturing.

15. The curved flow channel of claim 13, wherein the plurality of unit lattices are arranged in a uniform distribution.

16. The curved flow channel of claim 13, wherein the plurality of unit lattices are arranged in a non-uniform distribution.

17. A curved flow channel with built-in lattice structure, the curved flow channel comprising:
    a curved section;
    a lattice structure disposed inside the curved section and at an outer inside wall of the curved section away from a center of curvature of the curved section, a cross-sectional area of the lattice structure being equal to or less than a half of a cross-sectional area of the curved section of the curved flow channel, wherein the lattice structure comprises a plurality of unit lattices, and the plurality of unit lattices are arranged in a non-uniform distribution.

18. The curved flow channel of claim 17, wherein the lattice structure is integrated with the curved flow channel via additive manufacturing.

* * * * *